May 15, 1923.
S. B. VARNER
DEMOUNTABLE RIM
Filed March 25, 1922
1,455,684
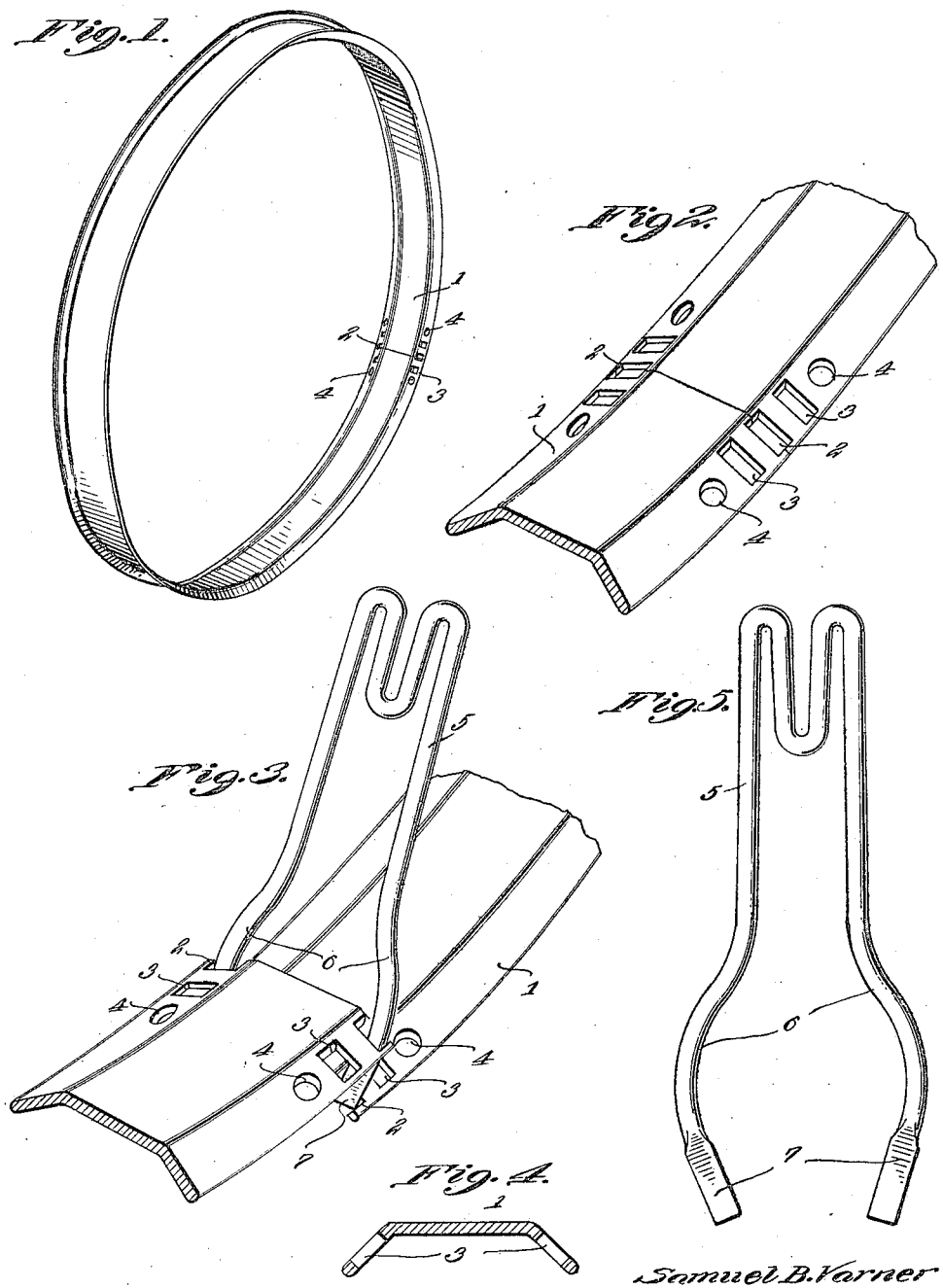

Patented May 15, 1923.

1,455,684

UNITED STATES PATENT OFFICE.

SAMUEL B. VARNER, OF GRANBY, MISSOURI.

DEMOUNTABLE RIM.

Application filed March 25, 1922. Serial No. 546,761.

*To all whom it may concern:*

Be it known that I, SAMUEL B. VARNER, a citizen of the United States, residing at Granby, in the county of Newton and State of Missouri, have invented new and useful Improvements in Demountable Rims, of which the following is a specification.

The object of my said invention is the provision of a resilient demountable rim the end portions of which are constructed in an exceedingly simple and inexpensive manner, whereby with the assistance of a simple and inexpensive tool, the rim may be manipulated either to render it smaller or to put its ends together in opposed relation ready for use on a wheel.

To the attainment of the foregoing, the invention consists in the improvement as hereinafter described and definitely claimed.

In the accompanying drawings, forming part of this specification:—

Figure 1 is a perspective of a demountable rim constructed in accordance with my invention.

Figure 2 is an enlarged detail view showing the ends of the rim in opposed relation.

Figure 3 is a similar view showing the ends of the rim in lapped relation, and the tool applied.

Figure 4 is a transverse section taken through one of the end portions of the rim.

Figure 5 is a detail view showing the tool that I prefer to employ in the manipulation of the rim ends.

Similar numerals of reference designate corresponding parts in all of the views of the drawings.

The rim 1 is of the ordinary channeled form in cross section as appears in the drawings, and in accordance with my invention each end of the rim is notched adjacent to its side edge as designated by 2. Back of each notch 2 each of the end portions of the rim is provided with an oblong aperture 3 and a circular aperture 4 for the engagement of tools with different ends, there being notches 2, apertures 3 and apertures 4 adjacent to each side edge of the rim, and the apertures 3 being arranged with their greatest lengths crosswise of the rim.

The illustrated tool 5 is characterized by two tangs 6 the ends of which are flattened after the manner of a screw driver as designated by 7 for use in conjunction with the notches 2 or the apertures 3. The said tool is shown in Figure 3 as inserted in a notch 2 in the overlapping end of the rim and in a notch 2 of the inner end, and the tool is adapted to be manipulated—i. e., pulled back to make the rim smaller or pushed forward to arrange the ends together in opposed relation so as to render the rim ready for use on a wheel felly.

It will be apparent from the foregoing that my improvement is extremely simple and inexpensive, and that the provision of the notches and apertures in the end portions of a rim at the time of manufacture does not appreciably increase the cost of the rim; also, that it is feasible to provide rims such as at present in use with notches and apertures of the kind indicated at small cost.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A resilient wheel rim, each of the end portions of which is provided with longitudinal series of apertures adjacent to its side edges; one end aperture of each series being in the form of a notch in one end of the rim, whereby a double tang tool can be used to expand the rim and position the ends thereof in opposed relation.

In testimony whereof I affix my signature.

SAMUEL B. VARNER.